US008738023B2

(12) United States Patent
Gabara et al.

(10) Patent No.: US 8,738,023 B2
(45) Date of Patent: May 27, 2014

(54) METHOD AND APPARATUS FOR AUTOMATIC DETERMINATION OF OPTIMAL USER DEVICE LOCATION IN A WIRELESS NETWORK

(75) Inventors: Thaddeus John Gabara, Murray Hill, NJ (US); Lawrence Allen Rigge, Emmaus, PA (US)

(73) Assignee: Agere Systems LLC, Allentown, PA (US)

( * ) Notice: Subject to any disclaimer, the term of this patent is extended or adjusted under 35 U.S.C. 154(b) by 4178 days.

(21) Appl. No.: 10/668,544

(22) Filed: Sep. 23, 2003

(65) Prior Publication Data

US 2005/0064870 A1    Mar. 24, 2005

(51) Int. Cl.
*H04W 24/00* (2009.01)

(52) U.S. Cl.
USPC ............... 455/452.2; 455/456.1; 455/423; 455/63.1; 455/67.11; 455/513; 455/67.14; 455/450; 370/338; 370/328; 370/236

(58) Field of Classification Search
CPC ..... H04W 24/00; H04W 24/02; H04W 28/22; H04W 40/02; H04W 52/0245; H04W 52/243; H04W 52/265; H04L 1/0026; H04L 1/20
USPC ............ 455/41.2, 438, 437, 439, 435.1, 513, 455/509, 67.11, 450, 456.1, 452.2, 423, 455/63.1, 67.14; 370/328, 338, 252, 254, 370/253, 310, 312; 705/26, 410, 28, 37, 75; 375/224, 341
See application file for complete search history.

(56) References Cited

U.S. PATENT DOCUMENTS

| 6,522,881 | B1 |   | 2/2003 | Feder et al. |
|---|---|---|---|---|
| 6,625,135 | B1 | * | 9/2003 | Johnson et al. ............... 370/332 |
| 6,813,501 | B2 | * | 11/2004 | Kinnunen et al. ......... 455/456.2 |
| 2002/0044528 | A1 | * | 4/2002 | Pogrebinsky et al. ........ 370/230 |
| 2002/0060995 | A1 |   | 5/2002 | Cervello et al. |
| 2002/0094778 | A1 |   | 7/2002 | Cannon et al. |
| 2003/0017858 | A1 | * | 1/2003 | Kraft et al. .................... 455/566 |
| 2003/0064718 | A1 |   | 4/2003 | Haines et al. |
| 2004/0052232 | A1 | * | 3/2004 | Ramaswamy et al. ........ 370/338 |
| 2004/0185785 | A1 | * | 9/2004 | Mir et al. .................... 455/67.11 |
| 2004/0203698 | A1 | * | 10/2004 | Comp .......................... 455/421 |
| 2004/0203889 | A1 | * | 10/2004 | Karaoguz ................. 455/456.1 |
| 2004/0260808 | A1 | * | 12/2004 | Strutt ........................... 709/224 |

* cited by examiner

*Primary Examiner* — Patrick Edouard
*Assistant Examiner* — Fred Casca
(74) *Attorney, Agent, or Firm* — Ryan, Mason & Lewis LLP

(57) ABSTRACT

Techniques are disclosed for automatic generation of a location-indicative instruction displayable to one or more users in a communication system which includes a wireless network comprising a plurality of user devices adapted for communication with at least one access point device. A test of a communication link between at least one of the user devices and the access point device is initiated. Based at least in part on a result of the test, an instruction displayable to a user associated with a given one of the user devices is generated, the instruction being indicative of a location at which the given user device is expected to obtain a particular level of data throughput performance.

18 Claims, 3 Drawing Sheets

METHOD AND APPARATUS FOR AUTOMATIC DETERMINATION OF OPTIMAL USER DEVICE LOCATION IN A WIRELESS NETWORK

FIELD OF THE INVENTION

The present invention relates generally to communication systems, and more particularly to wireless local area networks (LANs) and other types of wireless networks.

BACKGROUND OF THE INVENTION

In conventional wireless LANs, user devices such as personal computers and personal digital assistants (PDAs) communicate with access point (AP) devices in accordance with specified standards. One such standard is described in the Institute of Electrical and Electronics Engineers (IEEE) 802.11b standards document, which is incorporated by reference herein. The 802.11b standard supports data rates of up to 11 Mbps in the 2.4 GHz industrial, scientific and medical (ISM) band, using direct sequence spread spectrum (DSSS).

Efforts have been made to increase the data bandwidth capabilities of wireless LAN standards such as 802.11b. For example, the 802.11a standard has recently been developed, which supports data rates of up to 54 Mbps in the 5 GHz band using orthogonal frequency division multiplexing (OFDM). Another recently-developed standard is 802.11g, which can support data rates of up to 54 Mbps in the 2.4 GHz band, using DSSS for data rates below 20 Mbps, and OFDM for data rates above 20 Mbps. The 802.11a and 802.11g standards documents are also incorporated by reference herein.

A significant problem that arises in conventional wireless LANs such as those described above is that it is often difficult for a mobile user to determine an appropriate location within the network for achieving maximum data throughput. It is well known that data throughput is influenced by a number of factors, such as received signal strength and received signal quality, which can vary greatly from location to location within the coverage area of a given access point device or set of access point devices. Typically, a user device in a wireless LAN is configured so as to include meters for signal strength and signal quality, which provide a visual indication of these factors in terms of percentages of specified maximum values.

In many situations, a user has a number of different choices in terms of selecting a possible location for interaction with an access point. For example, this is generally the case in public "hot spots," such as those provided in a coffee shop, airport or train station, where the user could sit in any of a number of different locations. In these and other similar situations, the user can simply walk about the area while monitoring the meters on the device display, and thereby eventually determine an appropriate location suitable for maximizing data throughput. Unfortunately, the user in this approach is essentially on his or her own, individually determining an appropriate location by trial and error using the meters mentioned above, without any proactive assistance whatsoever from the network. Any mistakes made by one user in his or her determination may be repeated by many other users.

Moreover, public environments of the type described above may be subject to frequent environmental changes, such as the adding or dropping of users, and time-varying levels of electronic interference or signal reflections. As a result, it may be necessary for a given user to periodically repeat the trial-and-error optimization procedure.

Accordingly, a need exists for alternative techniques for determining appropriate locations for user devices in a wireless network, so as to achieve enhanced data throughput without the above-noted difficulties associated with the conventional trial-and-error approach to individualized location determination.

SUMMARY OF THE INVENTION

The present invention provides techniques for automatic determination of appropriate locations for user devices in a wireless network. The wireless network comprises a plurality of user devices adapted for communication with at least one access point device.

In accordance with one aspect of the invention, a test of a communication link between at least one of the user devices and the access point device is initiated. Based at least in part on a result of the test, an instruction displayable to a user associated with a given one of the user devices is generated, the instruction being indicative of a location at which the given user device is expected to obtain a particular level of data throughput performance.

In an illustrative embodiment, the given user device upon initiation of the test is at a current location, and the instruction is indicative of another location associated with an improved level of data throughput performance relative to that of the current location.

The location-indicative instruction may be displayed on a display screen of the user device, or on a display screen that is not part of the user device. An example of the latter type of display arrangement is one in which a facility includes a display identifying a particular location within that facility that is expected to exhibit optimal throughput performance under the existing environmental conditions. Mechanisms other than display screens may be used in presenting the location-indicative instruction to a user, including audio-based mechanisms, tactile mechanisms, etc.

Advantageously, the techniques of the invention avoid the need for the above-described trial-and-error approach to location determination, and its associated disadvantages. For example, in the illustrative embodiment, a given user is provided with one or more instructions which direct that user to a location providing enhanced data throughput relative to a current location. Such techniques help to optimize overall system data throughput, in a manner that is responsive to frequent environmental changes. This can reduce the number of access point devices needed in a given facility, while also increasing revenue for system providers.

DETAILED DESCRIPTION OF THE INVENTION

The invention will be illustrated herein in conjunction with exemplary wireless networks which include transceiver hardware configured in accordance with a wireless network standard such as the IEEE 802.11b standard. It should be understood, however, the invention is not limited to use with this particular standard, or to use in the exemplary wireless network configurations shown and described in conjunction with the illustrative embodiments. The invention is more generally applicable to any wireless networking application in which it is desirable to provide improved techniques for determining appropriate locations for user devices, including wireless metropolitan area networks (MANs) and wireless wide area networks (WANs). The invention does not require the particular elements of the illustrative embodiment, and other elements can be used in addition to or in place of the particular elements shown.

The term "processing device" as used herein is intended to include, by way of example and without limitation, any device capable of communicating within a wireless LAN, MAN, WAN or other type of wireless network. A given processing device may thus be an access point device or a user device such as a desktop computer, portable computer, PDA, mobile telephone, etc.

It should be noted that a user device may also serve as an access point device in a given embodiment of the invention. An example of such an embodiment is one which includes a mesh network. A single processing device in accordance with the present invention may therefore comprise both a user device and an access point.

Figure 1:
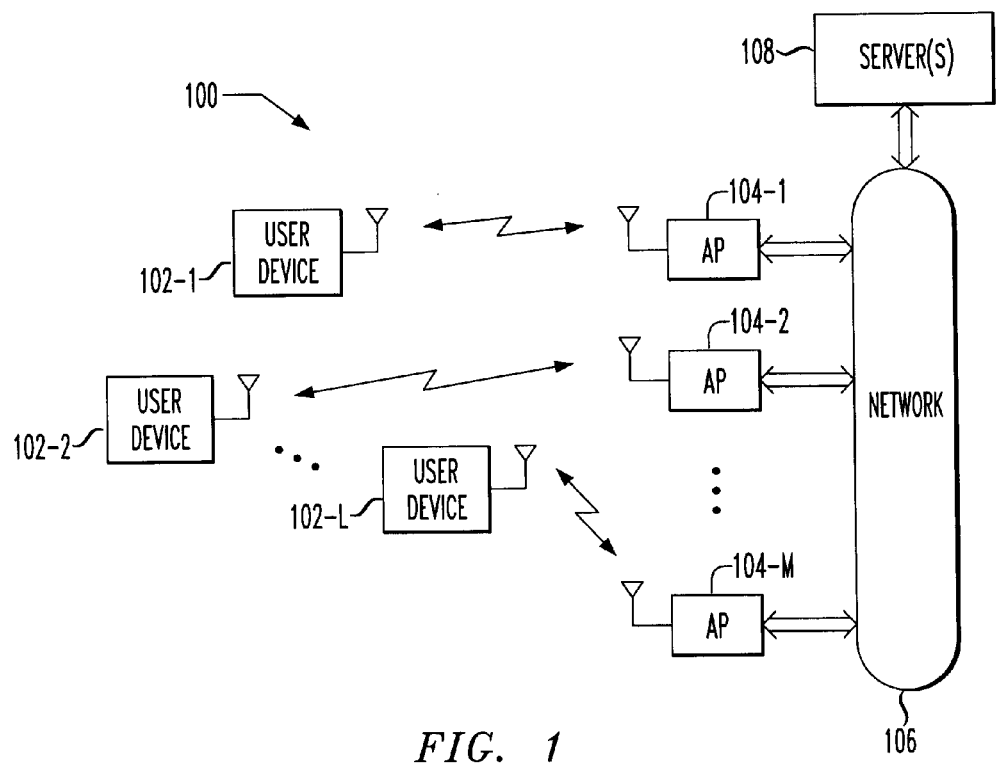
FIG. 1 shows a communication system comprising a wireless network configured in accordance with an illustrative embodiment of the invention.

FIG. 1 shows a communication system 100 which includes a wireless network configured in accordance with an illustrative embodiment of the invention. The system 100 includes a number of user devices 102-1, 102-2, . . . 102-L, which communicate with access point devices 104-1, 104-2, . . . 104-M. The particular values of L and M are purely arbitrary, as the system 100 may include any desired number of user devices and access point devices, in any configuration. As shown in the figure, each of the user devices and the access point devices has an antenna associated therewith. Also, each of the access point devices provides an interconnection with a network 106, which may represent, by way of example, the Internet, an intranet, an extranet, a wired LAN, a public switched telephone network (PSTN), or other wired network. The access point devices 104 can communicate via network 106 with one or more servers 108. The user devices can also communicate, via the access point devices, with the one or more servers 108.

It is assumed without limitation that each of the user devices 102 and access point devices 104 in the illustrative embodiment is configured to operate in accordance with a communication protocol of a wireless network standard, such as the IEEE 802.11b standard. For example, each of the user devices 102 and access point devices 104 may be compatible with at least one of the 802.11a standard, the 802.11b standard and the 802.11g standard. Again, this assumption is made for purposes of simplicity and clarity of illustration only. Other embodiments of the invention can utilize other wireless network standards, non-standard implementations, or combinations thereof.

The user devices 102 may comprise otherwise conventional processing devices, such as desktop or portable personal computers, PDAs, mobile telephones, or any other type of device which can operate as an element of a wireless network, suitably modified to incorporate functionality associated with an automatic location determination feature of the present invention. Similarly, the access point devices 104 may comprise otherwise conventional access point devices suitably modified to incorporate functionality associated with an automatic location determination feature of the present invention. The conventional aspects of such user devices and access point devices are well-known in the art and therefore will not be described in further detail herein.

Figure 2:
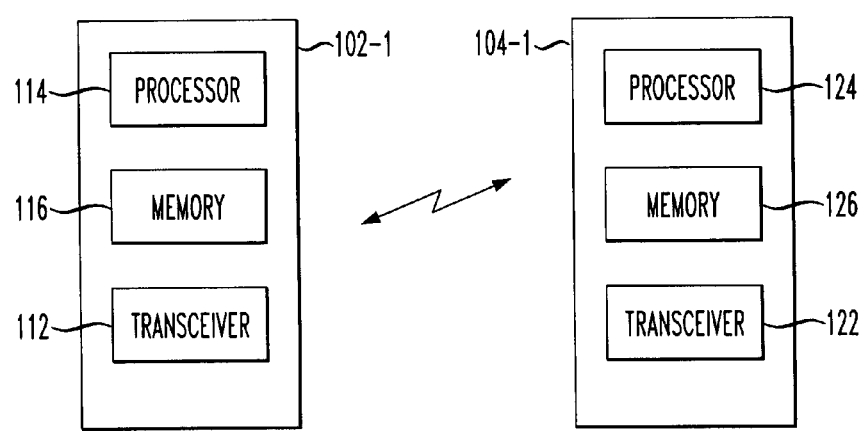
FIG. 2 illustrates possible embodiments of a given user device and associated access point device of the FIG. 1 system.

FIG. 2 shows a more detailed view of a given user device 102-1 and an access point device 104-1 of the system 100. The user device 102-1 includes a transceiver 112, a processor 114 and a memory 116. Similarly, the access point device 104-1 includes a transceiver 122, a processor 124 and a memory 126. Software code for implementing the above-noted functionality associated with an automatic location determination feature of the invention may be stored in the memories 116, 126 and executed by the processors 114, 124.

One or more of the other user devices and access point devices of the system 100 of FIG. 1 may, but need not, be configured in a manner similar to that shown for user device 102-1 and access point device 104-1 in FIG. 2.

It is also to be appreciated that the user device 102-1 and access point device 104-1 in the illustrative embodiment may further include, in addition to or in place of the particular modules or other elements shown in FIG. 2, additional modules and other elements of a type commonly found in conventional implementations of such devices. These conventional modules and other elements, being commonly used in the art, will not be described in detail herein.

In accordance with one aspect of the invention, the system 100 is configured so as to provide location-indicative instructions to system users associated with the user devices 102 regarding appropriate positioning of those devices within the wireless network so as provide optimal data throughput performance to one or more of the users. This location determination feature is characterized herein as "automatic" in that it is preferably implemented in a manner that does not require the user to take any particular steps in order to be provided with a location-indicative instruction. For example, a location-indicative instruction can be generated and displayed to one or more system users as soon as such users connect to the wireless network, or even prior to connection of one or more of the users to the wireless network.

The process of generating a location-indicative instruction in the illustrative embodiment generally involves initiating a test of a communication link between at least one of a plurality of user devices and an access point device, and generating, based at least in part on a result of the test, an instruction displayable to a user associated with a given one of the plurality of user devices. The instruction is indicative of a location at which the given user device is expected to obtain a particular level of data throughput performance. For example, the location may comprise a location at which the given user device is expected to obtain a maximum achievable level of data throughput performance under the existing system conditions. Advantageously, this approach avoids the need for each user to execute a trial-and-error approach in order to find an optimal location.

It should be noted that the term "optimal" as used herein should not be construed as requiring any specific maximum achievable level of data throughput performance. Instead, it is intended to include a best or near-best level under an existing set of conditions. More generally, it may be viewed as representing a data throughput performance level that is considered the best among levels associated with a number of alternative locations.

The term "particular level" as used herein in the context of data throughput performance is therefore intended to include, without limitation, a maximum achievable level, or any other level that may represent, for example, an improvement in performance for a given user relative to a current level likely to be achieved by that user. A particular level may therefore be an improved level relative to a current level. The data throughput performance may be measured in any desired manner, for example, using signal strength, signal-to-noise ratio, bit rate, bit error rate, or other measures, as well as combinations of such measures.

The particular user device or devices used in the test need not be the same user device at which the location-indicative instruction is displayed. For example, the system 100 may be configured so as to process test results obtained utilizing one or more of user devices 102-2 through 102-L in order to generate a location-indicative instruction that is displayable to a user associated with the user device 102-1. As another example, the test results utilized to generate the location-indicative instruction that is displayed on a given user device may be obtained by testing a communication link between that user device and the access point, with or without additional test results obtained using other user devices.

The location-indicative instruction generated using the above-described process may be displayable on a display screen of the user device. Alternatively, the location-indicative instruction may be displayable on a display screen that is not part of the user device. An example of the latter type of arrangement will be described below in conjunction with FIG. 4. Also, combinations of these and other types of display arrangements may be used in presenting location-indicative instruction information to users associated with the user devices.

The term "displayable" as used herein in the context of a location-indicative instruction is intended to include, without limitation, presentable to the user via any mechanism suitable for making the instruction content perceptible to the user. Such mechanisms may include, by way of example, speakers or other audio-based mechanisms, tactile mechanisms, and the like. A given user device in accordance with the invention therefore need not include a display screen.

Figure 3:
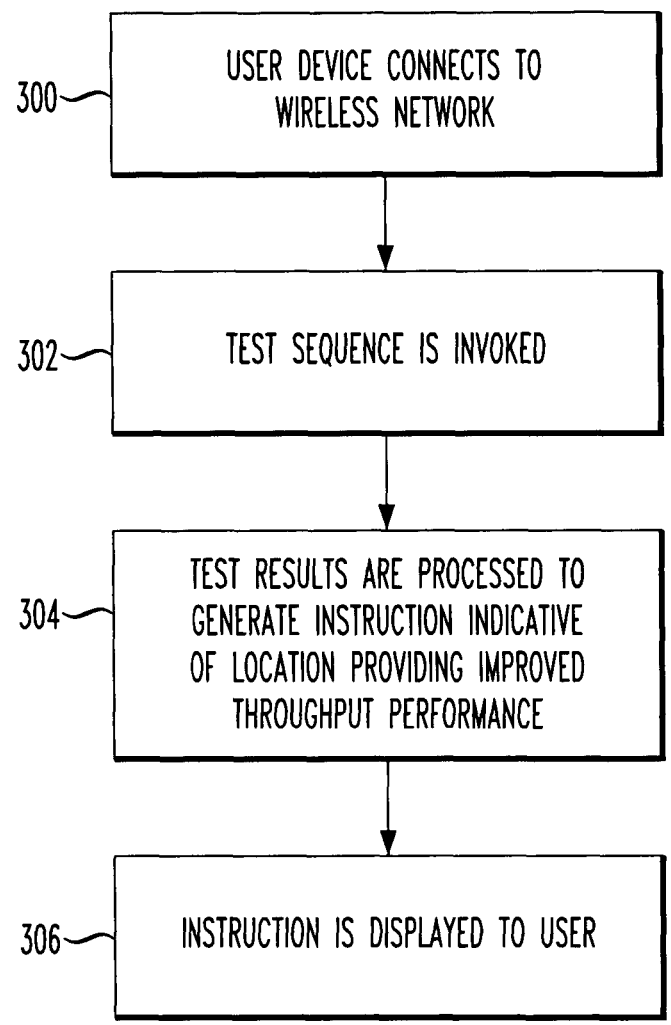
FIG. 3 is a flow diagram of an example process for automatic determination of an appropriate location for a user device in the FIG. 1 system.

FIG. 3 is a flow diagram of one example process for automatic determination of an appropriate location for a user device in the system 100 using the techniques of the invention. In this example, a user device in step 300 connects to the wireless network. A test sequence is then invoked in step 302. Test results are then processed to generate an instruction indicative of a location providing improved data throughput performance, as shown in step 304. Finally, the generated location-indicative instruction is displayed to a user in step 306. As noted above, the user to whom the instruction is displayed may be the user associated with the user device that participates in the test of step 302, or may be another system user associated with another user device that does not participate in the test.

As a more particular example of the process shown in FIG. 3, a given user device upon its connection to an access point device of the wireless network may itself participate in the test sequence. If the location of the given user device when the test sequence is invoked is denoted as the current location, the generated location-indicative instruction, which may be displayed on that device, may be indicative of another location associated with an improved level of data throughput performance relative to that of the current location.

The test referred to in step 302 may involve a test of an uplink communication channel between the user device and the access point device, a test of a downlink communication channel between the user device and the access point device, or a combination of tests of uplink and downlink channels. The invention does not require the use of any particular test, and numerous tests suitable for use with the techniques of the invention are known to those skilled in the art.

The test may be initiated upon access to the server(s) 108 connected to the access point device via network 106. For example, the test sequence may be specified in whole or in part using information retrievable by the user device or the access point device from server(s) 108 via the network 106. Such a test sequence may involve the transmission of a plurality of known packets at different bit rates between the user device and the access point device. The test sequence may be initiated by the user device, with the packets being transmitted to the access point device and returned from the access point device to the user device. As another example, the test sequence may be initiated by the access point device, with the packets being transmitted from the access point device to the user device. Since the packet contents in this embodiment are known by the user device, the user device can compare the received packet contents to the expected packet contents in order to obtain measures of bit error rate. Packet bit rates can also be determined in a straightforward manner. The particular test sequences and the corresponding packet configurations utilized in a given embodiment may be based on conventional communication link testing techniques of a type well known in the art, and will therefore not be described in detail herein.

The test referred to in step 302 may be repeated periodically, using the given user device or other user devices of the system, in any combination, so as to ensure that system users are kept informed as to appropriate locations as system conditions change.

The generation of the location-indicative instruction may make use of system information relating to particular available locations within a given retail establishment, airport, train station or other facility. For example, such information may be derived from a global positioning system (GPS) and utilized within the system 100 to determine the location at which the given user device is expected to obtain a particular level of data throughput performance. One or more of the user devices may include GPS receivers which are used to supply the GPS information that is processed in generating the location-indicative instruction.

Numerous other types of system information may be used in the generation of the location-indicative instruction. For example, information derived from motion sensors may be used to determine positions of particular users, or to determine the level of activity within particular areas in a facility.

As another example, the system information may comprise current seat locations or other location information manually entered by system users. The system may be configured to analyze such data and to direct specific users to move to new locations. This type of arrangement could be particularly useful in allocating seating in aircraft, trains or other modes of transportation. The generation of location-indicative instructions in such an embodiment could be implemented based on information gathered when tickets are purchased, or may be implemented randomly based on empirical data of likely network users.

The processing associated with generation of a location-indicative instruction may be carried out by appropriate software programs implemented in the user devices 102, access points 104, server(s) 108, or elsewhere in the system 100. Such programs can cooperate with one another in a straightforward manner in gathering the test results and other information needed to determine an appropriate location-indicative instruction displayable to one or more system users.

The generated location-indicative instruction need not have any particular format. By way of example, such an instruction may comprise an indication of a particular area within a given facility, or an indication of a particular seating location in a group of seating locations within a given facility. As another example, the instruction may direct a user to move from a current location to another particular location within a facility, in a particular direction, or toward a particular known landmark.

Figure 4:
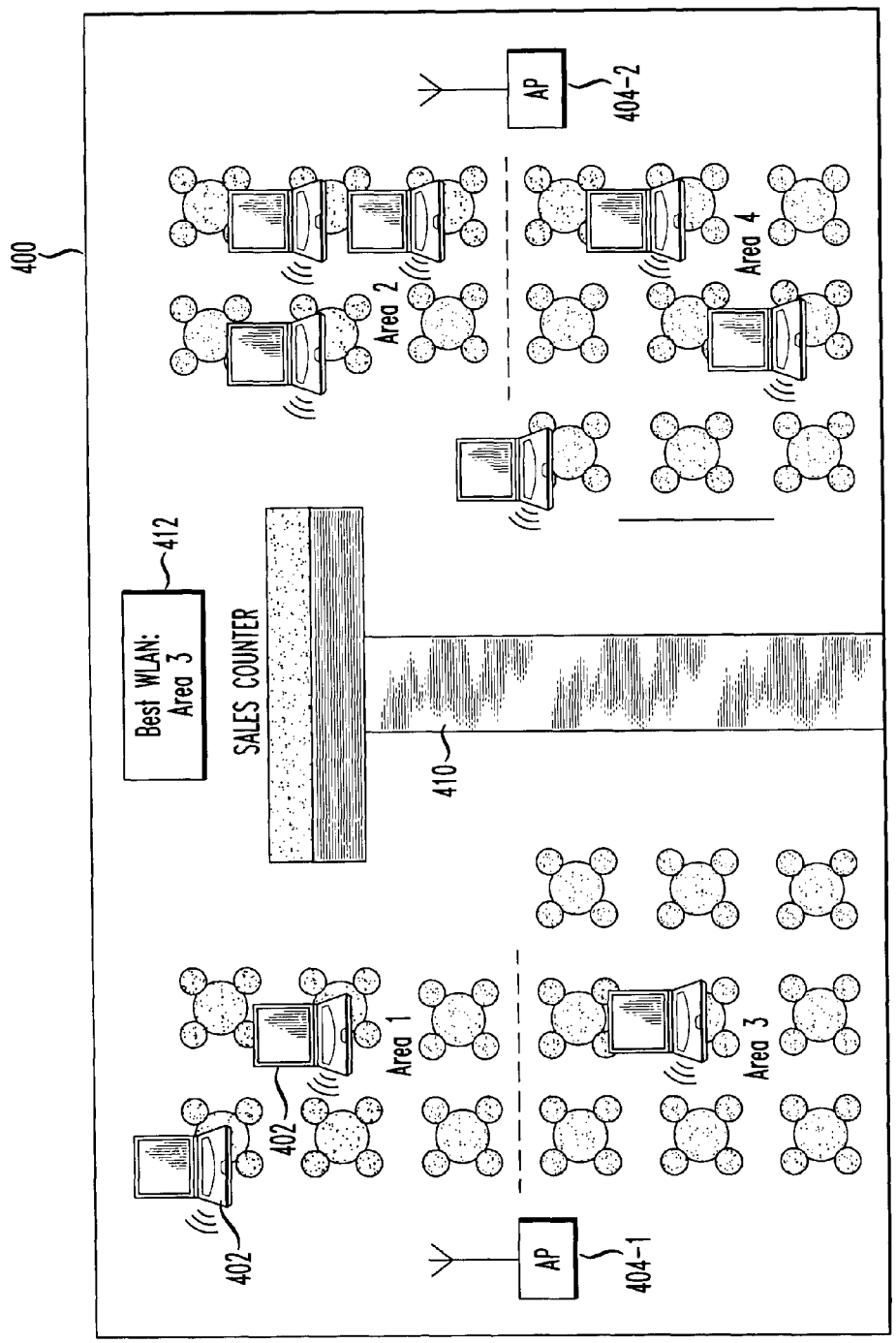
FIG. 4 shows an example of an implementation of the FIG. 1 system in a retail establishment.

FIG. 4 shows an example of an implementation of the FIG. 1 system in a facility comprising a retail establishment, such as a coffee shop. The facility 400 includes four distinct seating areas, denoted Area 1, Area 2, Area 3 and Area 4, each including a number of tables and chairs. Distributed throughout the facility are a number of user devices 402, shown generally as portable computers, and a pair of access point devices denoted 404-1 and 404-2. Also within the facility 400 are a sales counter 410 and a display screen 412.

The display screen 412 in this example displays a location-indicative instruction to one or more of the users associated with the user devices 402, indicating the particular one of the four areas of the facility 400 which is expected to provide the best data throughput performance for the users. In this example, the current display on display screen 412 indicates that the best wireless LAN connection will be achieved in Area 3.

The access point devices 404-1 and 404-2 are configured in this example to store information characterizing the various areas. The access point devices utilize this information, as well as test results obtained by testing various communication links in the system, to determine an appropriate location-indicative instruction to be displayed on the display screen 412.

The access point devices 404-1 and 404-2 may be configured in a straightforward manner to monitor communication link performance characteristics such as signal strength, signal-to-noise ratio, bit rate, bit error rate, and so on. Also available to these access point devices is information identifying client capability, such as the particular 802.11 standards supported by each client. Approximate location information for one or more client devices can also be determined, using GPS or other techniques such as triangulation techniques, power techniques, etc. Software within the access point devices, or accessible to these devices via the network 106 and server(s) 108, is utilized to process the test results and available location-related information so as to generate an appropriate location-indicative instruction on display 412.

Numerous other display arrangements could be used to convey a location-indicative instruction to one or more system users in accordance with the techniques of the invention. For example, each user could be provided with a display on his or her device which gives a list of potential seat locations in order of decreasing expected throughput. Other types of on-screen guidance could be provided to particular users.

The location-indicative instructions are preferably updated periodically, by repeating the communication link testing and other aspects of the described process, so as to reflect changes in the number and type of users, or other environmental factors within the facility.

As indicated above, the techniques of the present invention avoid the disadvantages associated with individual users carrying out trial-and-error searches in order to determine appropriate locations for their devices within a given facility. Moreover, such techniques help to optimize overall system data throughput, in a manner that is responsive to frequent environmental changes. This can reduce the number of access point devices needed in a given facility, while also increasing revenue for system providers.

The above-described embodiments of the invention are intended to be illustrative only. For example, although the illustrative embodiments are described with reference to the IEEE 802.11 standards, the invention can be used with other wireless networking standards, as well as with non-standard implementations, or combinations of multiple standard or non-standard implementations. Moreover, the particular types of location-indicative instructions described above, and the manner in which such instructions are provided to users, are exemplary only, and different instructions and display arrangements can be used in other embodiments. These and numerous other alternative embodiments within the scope of the following claims will be readily apparent to those skilled in the art.

What is claimed is:

1. A method for use in a wireless network comprising a plurality of user devices adapted for communication with at least one access point device, the method comprising the steps of:
    initiating a test of a communication link between at least one of the user devices and the access point device, the test comprising a determination of data throughput performance involving the transmission of a plurality of known packets at different bit rates between the at least one user device and the access point device;
    monitoring information characterizing an area, the information comprising communication link performance characteristics, information relating to capabilities of the plurality of user devices, and location information of the plurality of user devices;
    generating, based at least in part on a result of the test and the monitored information characterizing the area, an instruction displayable to a user associated with a given one of the user devices, the instruction being indicative of a location within the area at which the given user device is expected to obtain a particular level of data throughput performance;
    wherein the test comprises a test of at least one of an uplink communication channel between the at least one user device and the access point device and a downlink communication channel between the at least one user device and the access point device;
    wherein the test is initiated by the at least one user device, and the packets are transmitted to the access point device and returned from the access point device to the at least one user device;
    wherein the generating step utilizes information derived from a global positioning system (GPS) in determining the location at which the given user device is expected to obtain a particular level of data throughput performance; and
    wherein the generated instruction comprises an indication of a particular seating location in a group of seating locations within a given facility.

2. The method of claim 1 wherein the test further comprises a test of a communication link between the given user device and the access point device.

3. The method of claim 1 wherein the test further comprises a test of a communication link between one of the user devices, other than the given user device, and the access point device.

4. The method of claim 1 wherein the location comprises a location at which the given user device is expected to obtain a maximum achievable level of data throughput performance.

5. The method of claim 1 wherein the given user device is at a current location, and the instruction is indicative of another location associated with an improved level of data throughput performance relative to that of the current location.

6. The method of claim 1 wherein the generated instruction is displayable on a display screen of the given user device.

7. The method of claim 1 wherein the generated instruction is displayable on a display screen that is not part of the given user device.

8. The method of claim 1 wherein the test is initiated in conjunction with access to a server connected to the access point via a network.

9. The method of claim 1 wherein the generated instruction further comprises an indication of a particular area within a given facility.

10. The method of claim 1 wherein the given user device is compatible with at least one of the 802.11a standard, the 802.11b standard and the 802.11g standard.

11. The method of claim 1 wherein generating the instruction comprises generating a plurality of different instructions for respective users, the different instructions being based at least in part on a likelihood that respective users will utilize the network.

12. The method of claim 1 wherein generating the instruction comprises generating a plurality of different instructions for respective users, the different instructions being based at least in part on a time in which users purchased tickets for seating.

13. An apparatus for use in a wireless network including a plurality of user devices adaptable for communication with at least one access point device, the apparatus comprising:
a processing device having a processor coupled to a memory, the processing device comprising at least one of a user device and an access point device of the wireless network;
wherein the processing device is configurable to:
initiate a test of a communication link associated with at least one of the user devices, the test comprising a determination of data throughput performance involving the transmission of a plurality of known packets at different bit rates between the at least one user device and the access point device;
monitor information characterizing an area, the information comprising communication link performance characteristics, information relating to capabilities of the plurality of user devices, and location information of the plurality of user devices; and
generate, based at least in part on a result of the test and the monitored information characterizing the area, an instruction displayable to a user associated with a given one of the user devices, the instruction being indicative of within the area at which the given user device is expected to obtain a particular level of data throughput performance;
wherein the test comprises a test of at least one of an uplink communication channel between the at least one user device and the access point device and a downlink communication channel between the at least one user device and the access point device;
wherein the test is initiated by the at least one user device, and the packets are transmitted to the access point device and returned from the access point device to the at least one user device;
wherein the generating step utilizes information derived from a global positioning system (GPS) in determining the location at which the given user device is expected to obtain a particular level of data throughput performance; and
wherein the generated instruction comprises an indication of a particular seating location in a group of seating locations within a given facility.

14. A communication system comprising:
a wireless network including a plurality of user devices adaptable for communication with at least one access point device;
wherein a test of a communication link between at least one of the user devices and the access point device is initiated, the test comprising a determination of data throughput performance involving the transmission of a plurality of known packets at different bit rates between the at least one user device and the access point device;
wherein information characterizing an area is monitored, the information comprising communication link performance characteristics, information relating to capabilities of the plurality of user devices, and location information of the plurality of user devices;
wherein based at least in part on a result of the test and the monitored information characterizing the area, an instruction displayable to a user associated with a given one of the user devices is generated, the instruction being indicative of a location within the area at which the given user device is expected to obtain a particular level of data throughput performance; and
wherein the test comprises a test of at least one of an uplink communication channel between the at least one user device and the access point device and a downlink communication channel between the at least one user device and the access point device;
wherein the test is initiated by the at least one user device, and the packets are transmitted to the access point device and returned from the access point device to the at least one user device;
wherein the generating step utilizes information derived from a global positioning system (GPS) in determining the location at which the given user device is expected to obtain a particular level of data throughput performance; and
wherein the generated instruction comprises an indication of a particular seating location in a group of seating locations within a given facility.

15. An article of manufacture comprising a non-transitory machine-readable storage medium storing one or more software programs for use in a wireless network comprising a plurality of user devices adapted for communication with at least one access point device, wherein the one or more programs when executed implement the steps of:
initiating a test of a communication link between at least one of the user devices and the access point device, the test comprising a determination of data throughput performance involving the transmission of a plurality of known packets at different bit rates between the at least one user device and the access point device;
monitoring information characterizing an area, the information comprising communication link performance characteristics, information relating to capabilities of the plurality of user devices, and location information of the plurality of user devices;
generating, based at least in part on a result of the test and the monitored information characterizing the area, an instruction displayable to a user associated with a given one of the user devices, the instruction being indicative of a location within the area at which the given user device is expected to obtain a particular level of data throughput performance;
wherein the test comprises a test of at least one of an uplink communication channel between the at least one user device and the access point device and a downlink communication channel between the at least one user device and the access point device;

wherein the test is initiated by the at least one user device, and the packets are transmitted to the access point device and returned from the access point device to the at least one user device;

wherein the generating step utilizes information derived from a global positioning system (GPS) in determining the location at which the given user device is expected to obtain a particular level of data throughput performance; and wherein the generated instruction comprises an indication of a particular seating location in a group of seating locations within a given facility.

16. A method for use in a wireless network comprising a plurality of user devices adapted for communication with at least one access point device, the method comprising the steps of:

initiating a test of a communication link between a user device at a current location within an area and an access point device, the test comprising a determination of data throughput performance involving the transmission of a plurality of known packets at different bit rates between the at least one user device and the access point device;

monitoring information characterizing the area, the information comprising communication link performance characteristics, information relating to capabilities of the plurality of user devices, and location information of the plurality of user devices;

generating, based at least in part on a result of the test and the monitored information characterizing the area, an instruction displayable to a user associated with the user device, the instruction being indicative of another location within the area associated with an improved level of data throughput performance relative to that of the current location;

wherein the test comprises a test of at least one of an uplink communication channel between the at least one user device and the access point device and a downlink communication channel between the user device and the at least one access point device;

wherein the test is initiated by the at least one user device, and the packets are transmitted to the access point device and returned from the access point device to the at least one user device;

wherein the generating step utilizes information derived from a global positioning system (GPS) in determining the location at which the given user device is expected to obtain a particular level of data throughput performance; and wherein the generated instruction comprises an indication of a particular seating location in a group of seating locations within a given facility.

17. A method for use in a wireless network comprising a plurality of user devices adapted for communication with at least one access point device, the method comprising the steps of:

initiating a test of a communication link between at least one of the user devices and the access point device, the test comprising a determination of data throughput performance involving the transmission of a plurality of known packets at different bit rates between the at least one user device and the access point device;

monitoring information characterizing an area, the information comprising communication link performance characteristics, information relating to capabilities of the plurality of user devices, and location information of the plurality of user devices;

generating, based at least in part on a result of the test and the monitored information characterizing the area, an instruction displayable to a user associated with a given one of the user devices, the instruction being indicative of a location within the area at which the given user device is expected to obtain a particular level of data throughput performance;

wherein the test comprises a test of at least one of an uplink communication channel between the at least one user device and the access point device and a downlink communication channel between the at least one user device and the access point device;

wherein the test is initiated by the at least one user device, and the packets are transmitted to the access point device and returned from the access point device to the at least one user device;

wherein the generating step utilizes information derived from a global positioning system (GPS) in determining the location at which the given user device is expected to obtain a particular level of data throughput performance; and wherein the generating step comprises generating a plurality of different instructions for respective users, the different instructions being based at least in part on a likelihood that respective users will utilize the network.

18. A method for use in a wireless network comprising a plurality of user devices adapted for communication with at least one access point device, the method comprising the steps of:

initiating a test of a communication link between at least one of the user devices and the access point device, the test comprising a determination of data throughput performance involving the transmission of a plurality of known packets at different bit rates between the at least one user device and the access point device;

monitoring information characterizing an area, the information comprising communication link performance characteristics, information relating to capabilities of the plurality of user devices, and location information of the plurality of user devices;

generating, based at least in part on a result of the test and the monitored information characterizing the area, an instruction displayable to a user associated with a given one of the user devices, the instruction being indicative of a location within the area at which the given user device is expected to obtain a particular level of data throughput performance;

wherein the test comprises a test of at least one of an uplink communication channel between the at least one user device and the access point device and a downlink communication channel between the at least one user device and the access point device; and wherein generating the instruction comprises generating a plurality of different instructions for respective users, the different instructions being based at least in part on a time in which users purchased tickets for seating.

* * * * *